UNITED STATES PATENT OFFICE.

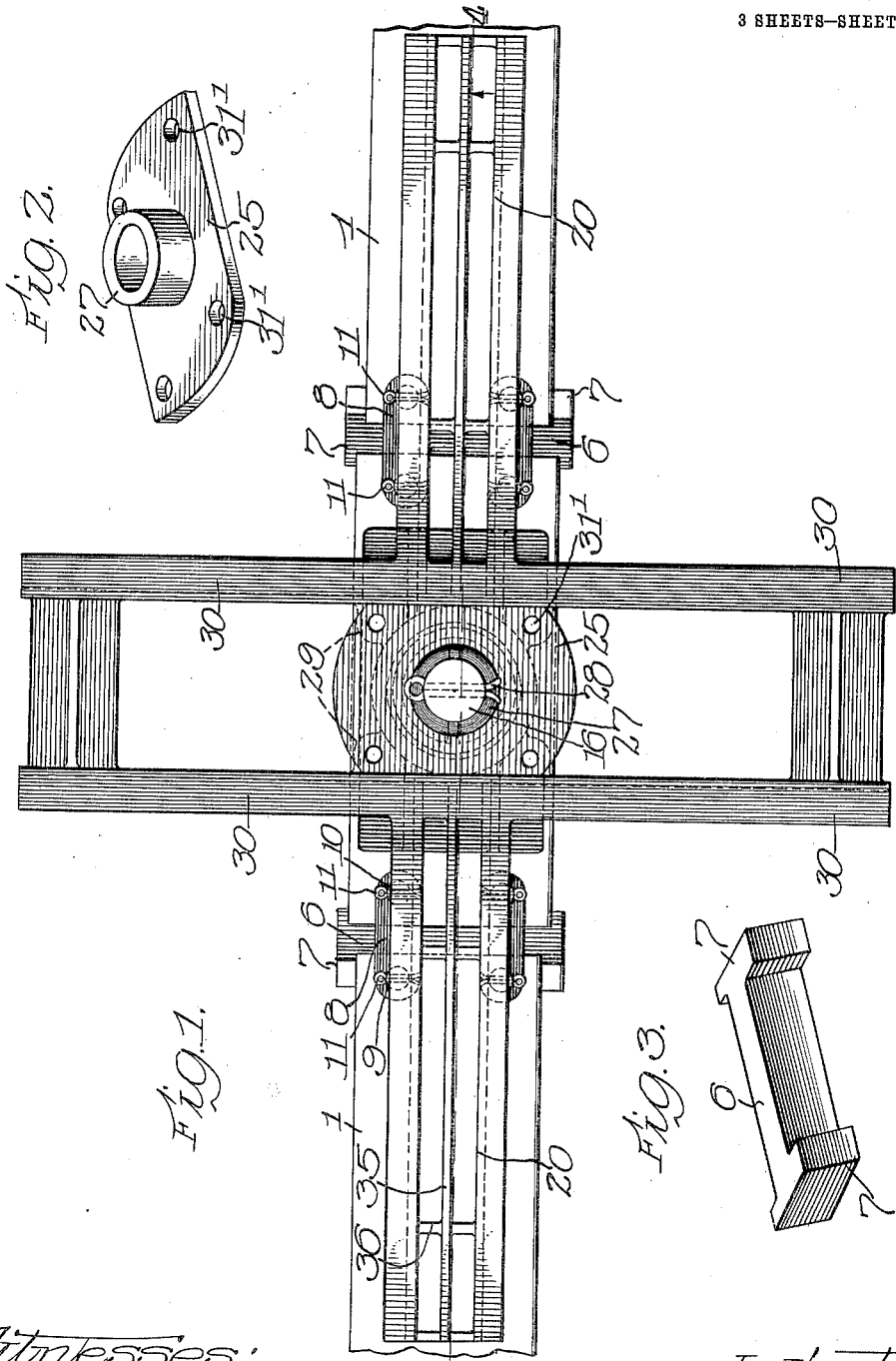

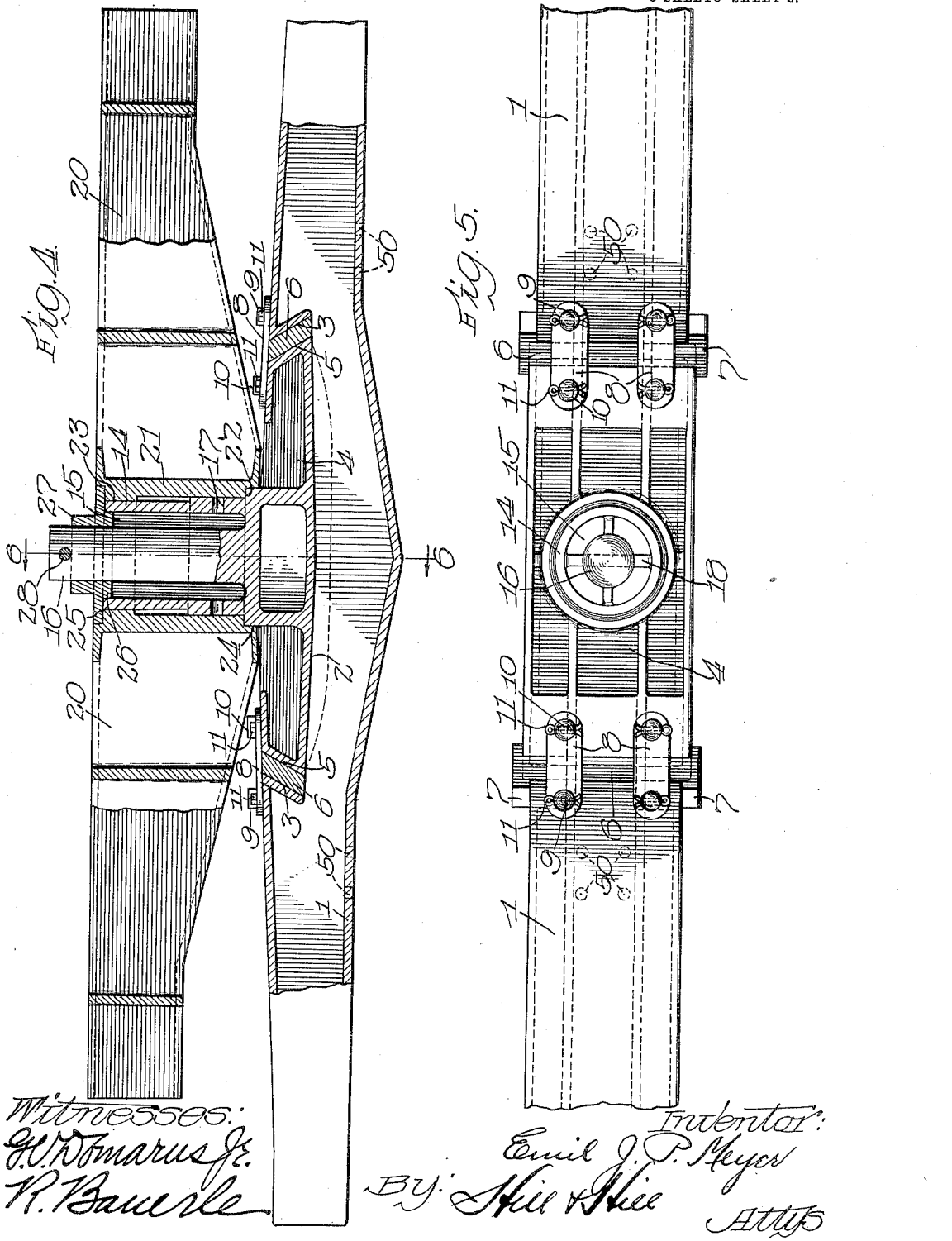

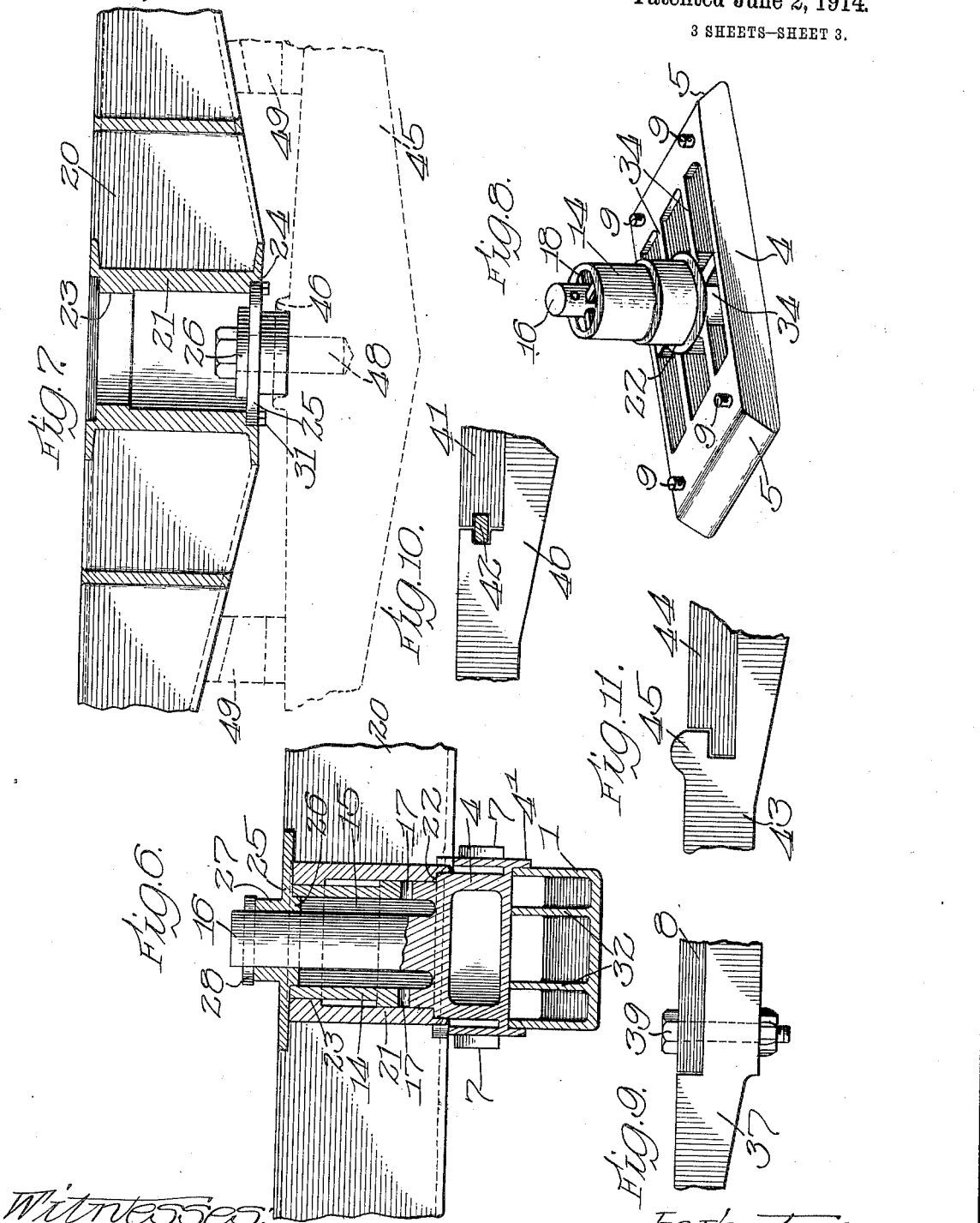

EMIL J. P. MEYER, OF CHICAGO, ILLINOIS.

CAR CONSTRUCTION.

1,098,820.

Specification of Letters Patent.

Patented June 2, 1914.

Application filed November 7, 1912. Serial No. 729,919.

*To all whom it may concern:*

Be it known that I, EMIL J. P. MEYER, a citizen of the United States, residing at Chicago, in the county of Cook and State of Illinois, have invented certain new and useful Improvements in Car Construction, of which the following is a description.

My invention belongs to that general class of devices in car constructions known as car bolsters, and relates particularly to an improved truck bolster and a coöperating body or cross bolster.

The invention has among its objects the production of a device of the kind described that is simple, convenient, efficient, durable, compact, and satisfactory.

It has among its further objects the production of a device in which the truck may be removed from the car with a minimum of labor and time, should the case require the removal, and a construction in which the body bolster may, in an emergency, be carried by almost any of the trucks now in use.

To this end my invention consists in the novel construction, arrangement, and combination of parts herein shown and described, and more particularly pointed out in the claims.

In the drawings, wherein like reference characters indicate like or corresponding parts, Figure 1 is a top plan view of the body and truck bolsters. Fig. 2 is a perspective view of the oil cup cap or plate 25. Fig. 3 is a perspective view of one of the key members 6. Fig. 4 is a partial sectional view taken substantially on line 4, 4 of Fig. 1. Fig. 5 is a top plan view of the truck bolster, the body bolster removed. Fig. 6 is a cross sectional view taken substantially on line 6, 6 of Fig. 4. Fig. 7 is a sectional view of the body bolster, illustrating the use of the same with the well known type of truck bolster. Fig. 8 is a perspective view of the detachable post and top part of the truck bolster. Fig. 9 is a side elevation of a portion of a modified construction of truck bolster. Fig. 10 is a similar view of another construction, and Fig. 11 is a similar view of still another modified construction.

Referring to the drawings, 1 represents the truck bolster, and 20 the body bolster, which is preferably provided with the extending parts 30 on each side, forming what is commonly known as a cross bolster, or really a cross body bolster. It may be mentioned at this time that I have not illustrated the complete car, nor have I shown in detail how the truck bolster is carried by the truck, or the car body by the body bolster, it being understood that these constructions may be as preferred. The present invention resides particularly in an improved connection between the bolsters, or between the truck bolster and car body. The bolsters are preferably cast steel; however, portions may be of cast steel and others of pressed steel, or the entire device constructed of pressed steel, or in an equivalent manner.

The truck bolster 1, which is suitably carried by one of the trucks, is preferably centrally recessed or cut out as at 2, the ends 3 of the recess being beveled or inclined, as shown. Arranged to seat in the recess is a removable bolster part or top 4, preferably having ends inclined substantially to conform to the ends 3 of the recess. The removable top part, however, is made shorter than the recess, and keys or gibs 6 inserted as shown. Referring particularly to Fig. 6, it will be noted that the sides of the detachable bolster part 4 are extended down as at 4′, so as to bear against each side of the bolster part 1, and prevent the transverse displacement of the parts. The keys 6 are preferably provided with heads 7, which lock the keys against endwise movement, as well as lock the two bolster parts against transverse movement relative each other. The keys 6 may be locked in position in any desired manner. As shown, lugs 9 are provided on the bolster part 1, and similarly formed lugs 10 on the part 4, and plates 8 arranged as shown and locked in position by pins 11. By this construction the two bolster parts are as firmly secured together as if they were formed integrally.

Extending from the upper side or top of the removable part 4 is a post 14. The post 14 is preferably chambered and provided with a centrally extending pin 16, the same being braced and the post strengthened by the partitions 18, or they may be termed spokes or spiders. Openings 17 are provided from each chamber through the wall 14, and in operation some preferred lubricant is placed in each of the chambers 15. The lubricant may pass through the openings 17 for lubricating the parts, as hereafter described.

The body bolster 20, as before mentioned, may be constructed of any suitable material, and is provided with a bearing part or member 21 at the center. As shown in the drawings, it is also extended upon each side at 30 for the attachment of the center beam or beams of the car. The bearing part 21 is arranged to seat upon the surface 22 of the post 14, so as to support the bolster and the car body carried thereby. The upper part is preferably formed as at 23, to bear against the upper part of the post, which is preferably reduced in diameter at the upper end, as most clearly shown in Figs. 4 and 6. When the post and bearings are constructed substantially as shown, the car body, etc., is supported without the aid of any side bearings employed upon the bolsters, if desired. If desired, the lower edge of the bearing 21 may be extended slightly below the bearing face 22 on the post, so as to prevent dust or dirt reaching the bearing. Arranged at the top of the post is a plate 25, which bears against the end of the post and the end of the bearing 21, the same being extended slightly as at 26 to the interior of the post. The same is also extended as at 27 upon the upper face for the purpose described hereafter, and secured in position in any suitable manner, as shown, by a pin 28 passing through the extending part 16 of the post 14. With this construction the post and bolster are securely locked together, and the chamber 15 closed at the top.

As before mentioned, the body bolster is provided with the extending parts 30 for attachment to the center beam of the car. The particular construction of the car frame or body, however, may vary to a considerable extent, depending upon the preference of the car manufacturer or user, and I therefore do not wish to be understood as limiting myself to the exact construction of body bolster, etc., inasmuch as the bearing part 21 may be secured to the center beam, or other part of the car frame, the two sides of the bolster being secured to those parts. Where the body part or frame of the car is of pressed steel, or other construction, the cross bolster shown might be entirely different.

In case it is desired to remove the truck from the car body, the body of the car is jacked up sufficiently to take all weight or pressure off of the bearing 22 at the base of the post. It will, of course, be understood that it is necessary to jack up the car sufficiently to take off any pressure on the springs of the truck, after which the plates 8 and the keys 6 are removed. The body is then further jacked until the extending part 4' is above the edge 2 of the recess, so that the truck can be removed out from under the end of the car. The pin 28, if desired, may then be removed, permitting the post and bolster part 4 to drop. If it is desired to place a new truck under the car, and the truck having a bolster similar to that shown is not at hand, the common type of truck may in an emergency be used. In this case the plate or cap 25 is removed from the top of the car bolster and secured in position at the lower end of the bearing 21 with the extension 27 down substantially as shown in Fig. 7. The plate 25 is then secured in position by bolts 31 extending through the holes 31' of the plate, and engaging in the bosses or extensions 29 (shown in dotted lines in Fig. 1) on the lower end of 21. The other form of truck having the bolster 45 with the plate 46 thereon, may then be placed under the bolster 20, and the body lowered so that the extension 27 fits in the recess in the top of the truck bolster 45. I have not considered it necessary to illustrate in detail the emergency truck bolster, this construction being familiar to those skilled in the art.

Referring particularly to Figs. 4 and 5, it will be noted that holes 50 are indicated in the bolster 1. These holes are placed there so that suitable side bearings 49 may be attached to the bolsters when an emergency truck is used, as illustrated in Fig. 7, if the same is desired. This permits the car to be used while being returned for repairs, since the same may be operated as well as one of the well known types of bolster connection. A pin or bolt 48 may be positioned through the opening substantially as shown. This gives an emergency repair and illustrates how the device may be used with different trucks and truck bolsters.

I have shown the truck bolster provided with ribs 32 for reinforcing the same, and the detachable part 4 with ribs 34. The body bolster is shown with reinforcing ribs 35 connected by the webs or spiders 36. This is for the purpose of illustration, however, for, as previously mentioned, the general construction of the bolsters may vary.

In Figs. 9, 10 and 11 several modified constructions are shown, for attaching the part 4 to the part 1. Referring to Fig. 9, 37 (which represents the bolster part 1 shown in the figures previously described), is the bolster of the truck, and 8 the removable bolster part, the parts being locked or secured together by bolts 39. In Fig. 10, the parts 40 and 41 are secured together by keys 42, the keys being locked in position in any suitable manner. In Fig. 11 the parts 43 and 44 are formed as shown, the part 44 at each end being engaged by the extended part 45. With this construction any form of keys or locking bolts, similar to any of those described, or their equivalents, may be employed.

Having thus described my invention, it is obvious that various immaterial modifications may be made in the same without departing from the spirit of my invention, hence I do not wish to be understood as limiting myself to the exact form, construction, arrangement, or combination of parts herein shown and described, or uses mentioned.

What I claim as new and desire to secure by Letters Patent is:—

1. In a device of the kind described and in combination, a truck bolster provided with a removable top having a post projecting therefrom, said top arranged at its ends and sides to engage said bolster on the top face and two adjacent sides and means for detachably securing said top to the bolster.

2. In a device of the kind described and in combination, a truck bolster with a removable top having a post formed integral therewith and projecting from the top side thereof, said top arranged to underlie a portion of the upper face of the bolster and overlap at the adjacent sides, and means for detachably securing said top to the bolster.

3. In a device of the kind described and in combination, a truck bolster provided with a removable top having a chambered post projecting therefrom, with openings to exterior of post proximate the bottom thereof, and means for detachably securing said top to the bolster.

4. In a device of the kind described and in combination, a truck bolster and a body bolster, one of said bolsters provided with a detachable post projecting therefrom, the other bolster being suitably formed to receive said post and means for keying said post to the bolster.

5. In a device of the kind described and in combination, a truck bolster and a body bolster, one of said bolsters provided with a detachable top having a post projecting therefrom, said post having a chamber therein and with a pin extending centrally therefrom, the other bolster being suitably formed to receive said post.

6. In a device of the kind described and in combination, a truck bolster and a body bolster, one of said bolsters provided with a detachable post, and the other being suitably formed to receive said post, said post being of sufficient length to extend through the bolster formed to receive the same, and having a bearing thereon at each end of the post.

7. In a device of the kind described and in combination, a truck bolster, a post detachably secured thereto, and a bearing member arranged about the post and supported thereby, said post chambered and having openings therefrom to the inner face of the said bearing member.

8. In a device of the kind described and in combination, a truck bolster provided with a removable interlocking top part having a post thereon, said top detachable by raising and thereafter transversely moving the same means for detachably securing and locking said top in position, with the post projecting upwardly from the bolster, a cross bolster provided with a suitable part having an opening therethrough for the reception of said post, and means for securing said part on said post.

9. In a device of the kind described and in combination, a truck bolster comprising a plurality of interengaging parts, one part provided with a post formed integral therewith, a coöperating body bolster provided with a bearing member arranged centrally thereof, and a plate positioned at the upper end of said bearing member and extending therein.

10. In a device of the kind described and in combination, a car truck bolster comprising a plurality of inter-engaging parts, one part provided with a chambered post having a pin extending centrally therefrom, and provided at the base with a bearing face, a bearing member rotatably mounted upon said post, and means for securing said bearing member thereon.

11. In a device of the kind described and in combination, a car truck bolster comprising mating parts, means for detachably securing said parts together, one of said parts provided with a post formed integrally therewith, a body bolster provided with an extension on each side, and with a centrally arranged bearing member having an opening therethrough, and means for securing said bearing member on said post, comprising a plate positioned on the top of the bearing member and extending therein, and means for securing said plate upon said post.

12. In a device of the kind described and in combination, a car truck bolster comprising a plurality of separable inter-engaging parts, means for locking said parts together comprising a plurality of detachable keys, one part provided with a post having a bearing proximate its base on the exterior thereof, a bearing member mounted upon said post and provided with means for securing the same to the car body, and means for securing said bearing member to said post.

13. In a device of the kind described, the combination of a car truck bolster comprising a plurality of inter-engaging parts, means for securing said parts together, one part provided with a chambered post formed integral therewith and having a pin extending centrally from the upper end thereof, said post provided with openings from the chamber therein to the exterior of the sides, and having a bearing proximate the base, a body bolster provided with a bearing member, mounted on said post, a plate positioned at the top of the bearing member, said plate provided with an extension into the interior of the bearing, and with an extension upon the opposite side, said post pin extending through said plate, and means for securing said plate upon the end of said post pin.

14. In a device of the kind described and in combination, a truck bolster provided with a top part having a post projecting therefrom, said top removable by an initial movement of one of the parts longitudinally the post, and a secondary transverse movement of one of the parts transversely the post, and means for detachably securing said top to the bolster.

15. In a device of the kind described and in combination, a truck bolster and a body bolster, said truck bolster provided with a detachable top part mounted thereon and underlying the top face of the bolster at the ends of the part, and having a flange at each side overlying the side faces of the bolster, said part provided with a suitably formed post projecting from the top thereof, the body bolster provided with a recessed bearing member arranged to receive said part.

16. In a device of the kind described and in combination, a truck bolster, a body bolster, said truck bolster provided with a recess at its center extending transversely across its upper face having downwardly diverging ends, a detachable top part mounted thereon having downwardly diverging ends, the distance between the ends of said part being slightly less than the distance between the ends of said recess, and means for locking said part in position, comprising a plurality of keys, said detachable top part provided with a suitably formed post projecting from the top thereof, and arranged to engage with the truck bolster.

17. In a device of the kind described and in combination, a truck bolster, a body bolster, said truck bolster provided with a recess at its center extending transversely across its upper face having downwardly diverging ends, a detachable top part mounted thereon in said recess and having downwardly diverging ends, said top part being flanged at the sides to overlie the sides of the bolster, and means for locking said part in position, comprising a plurality of keys flanged at their ends and positioned in said recess at the ends of said top part, and a suitably formed post projecting from said top part and arranged to engage with the truck bolster.

18. In a device of the kind described and in combination, a truck bolster and a coöperating body bolster, one of said bolsters provided with a recess at its center extending transversely across the face adjacent to the other bolster having inwardly diverging ends, a detachable part arranged in said recess and means for securing said part in position, comprising a plurality of suitably formed keys, and means for locking said keys in position, and a suitably formed post projecting from said detachable part arranged to engage with the other bolster.

In testimony whereof, I have hereunto signed my name in the presence of two subscribing witnesses.

EMIL J. P. MEYER.

Witnesses:
  ROY W. HILL,
  CHARLES I. COBB.

---

Copies of this patent may be obtained for five cents each, by addressing the "Commissioner of Patents, Washington, D. C."